June 30, 1970  G. E. LAUER  3,517,808
ARTICLE SORTING AND CONVEYING SYSTEM
Filed March 27, 1968  2 Sheets-Sheet 1
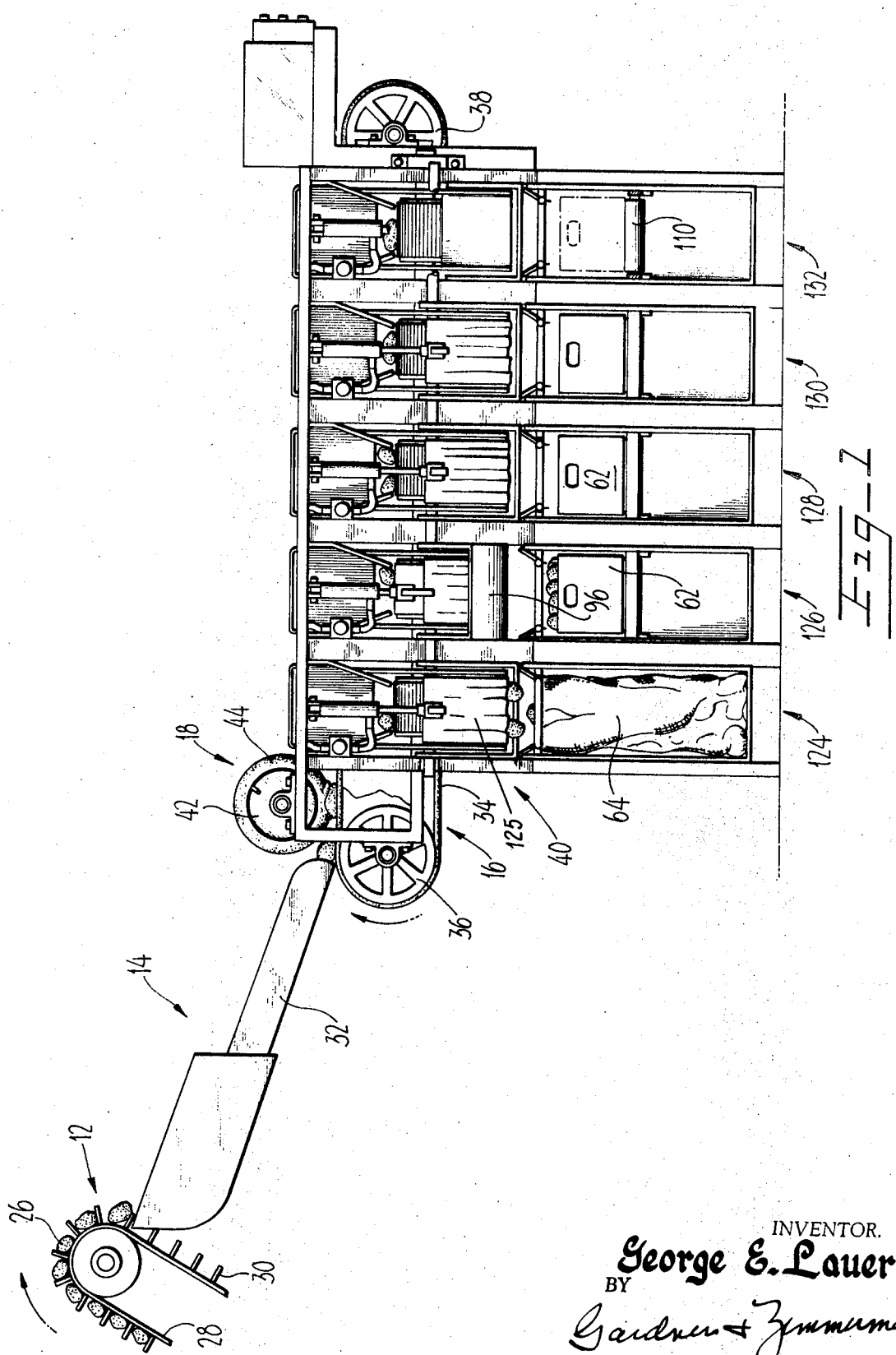
INVENTOR.
George E. Lauer
BY
Gardner + Zimmerman
ATTORNEYS

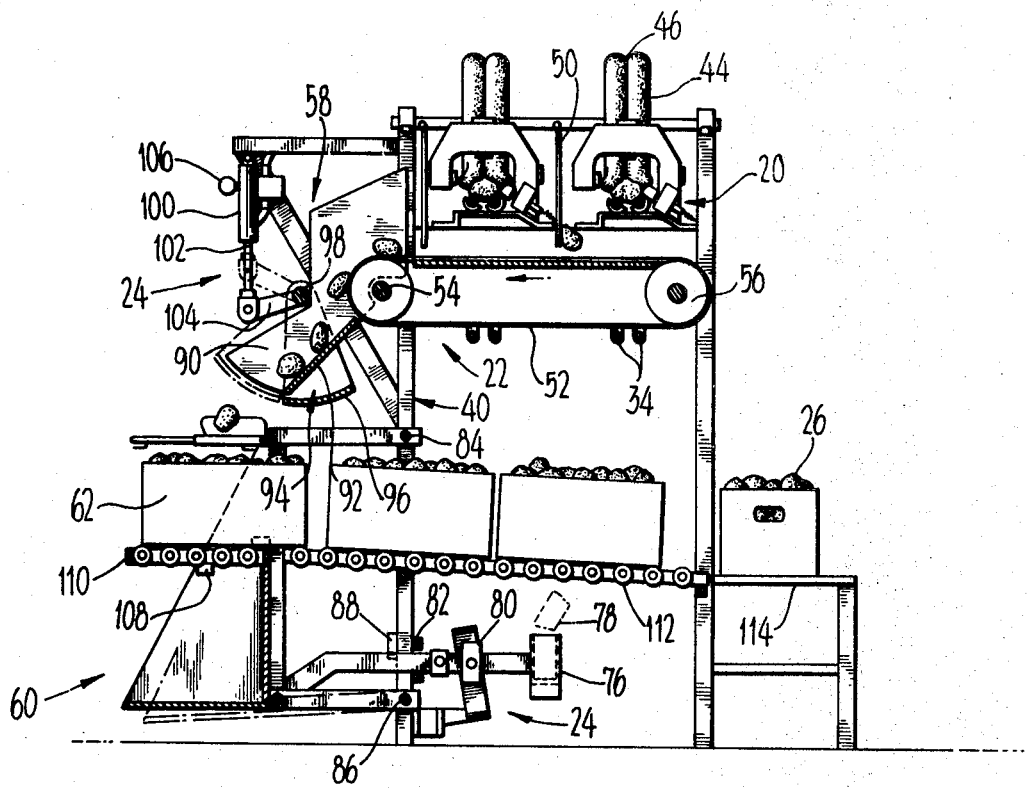
Fig_2
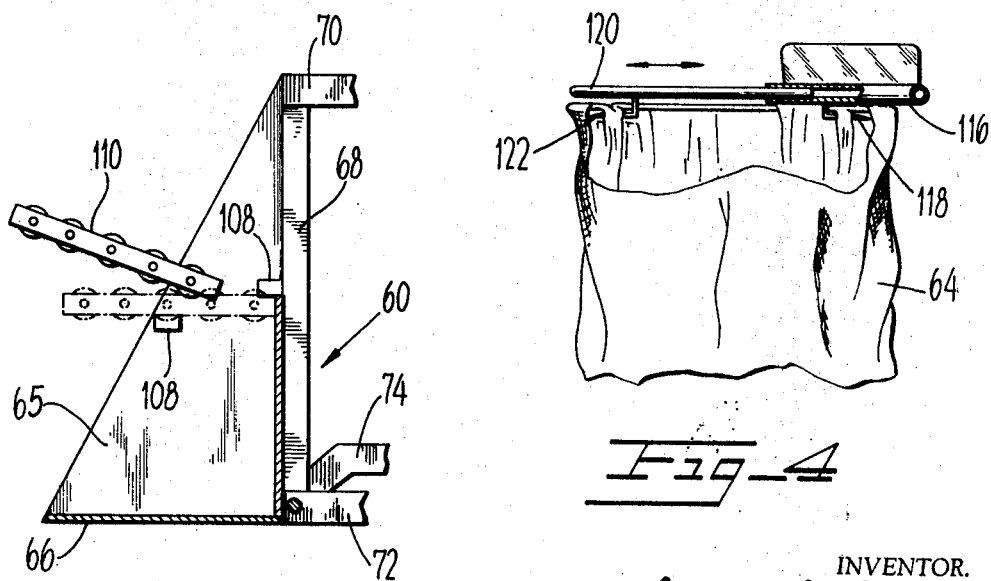
Fig_3
Fig_4
INVENTOR.
George E. Lauer

United States Patent Office 3,517,808
Patented June 30, 1970

3,517,808
ARTICLE SORTING AND CONVEYING SYSTEM
George E. Lauer, 2960 Chapman St.,
Oakland, Calif. 94601
Filed Mar. 27, 1968, Ser. No. 716,385
Int. Cl. B07c 1/02
U.S. Cl. 209—73
11 Claims

ABSTRACT OF THE DISCLOSURE

An apparatus for receiving articles such as potatoes, in which a device is provided for spacing the articles in alignment on a conveyor, a knock-off mechanism is utilized to direct articles of different sizes unto a plurality of article receiving members, and means are provided to intercept the flow of articles into the respective receiving members when a predetermined weight of such articles has been delivered.

Background of the Invention

In the sorting and weighing of articles of different sizes and weights, numerous problems arise where an attempt is made to automate the entire operation. Such problems are manifest in connection with the handling of potatoes which have a variety of sizes, and where it is desired to package some predetermined weight of potatoes, e.g., fifty or one hundred pounds in a box or sack, particularly where each box or sack is to contain potatoes having substantially the same size.

Since potatoes are a relatively inexpensive product, it is obvious that for economic reasons, the apparatus must be relatively simple and capable of high speed operation with a minimum of operational or other difficulties.

Although the apparatus disclosed in the drawings and presently to be described is utilized in connection with the handling of potatoes, it will be apparent that the invention is equally applicable to other articles where the same or similar problems may be present.

Brief description of the drawings

FIG. 1 is a side elevational view of the apparatus of the present invention.

FIG. 2 is an end elevational view of the structure shown in FIG. 1.

FIG. 3 is an enlarged end elevational view of a portion of the apparatus.

FIG. 4 is an enlarged front elevational view of the mechanism for supporting a sack in a potato receiving position.

Description of the preferred embodiment

In broad terms, the apparatus of the present invention generally includes a potato delivery mechanism 12, a shaker mechanism 14 for delivering potatoes to one or more horizontally disposed conveyors 16, means 18 for spacing the potatoes on the conveyor, devices 20 for ejecting potatoes from the conveyor according to size, means 22 for receiving the potatoes from the conveyor and delivering the same to a bag, box or other container, and means 24 for interrupting such delivery when a predetermined weight of potatoes is deposited in the respective containers.

For a more detailed explanation of the construction and operation of the apparatus, the following description will generally follow the course of travel of potatoes 26 as they pass through the mechanism.

As shown in FIG. 1, the potatoes 26 are initially dumped into a suitable bin (not shown into which the delivery mechanism 12 extends. Such mechanism consists of an inclined conveyor 28 having a plurality of longitudinally spaced transverse baffle plates 30 between which the potatoes are seated for transport from the bin in a generally upward direction and deposited into the shaker mechanism 14. This latter type of apparatus is well known in the art and includes a chute portion 32 which provides a longitudinal single file or column of potatoes in contacting relation.

In order to effect a subsequent separation or grading of potatoes according to size, it is necessary to first create a longitudinally spacing of the potatoes before they are deposited on the conveyor 16. As here illustrated, two such conveyors 16 are provided, so there will accordingly be provided two chutes 32 and two spacing means 18. Since the pairs are the same, a single explanation should suffice.

Each conveyor 16 consists of a pair of endless flexible and resilient belts 34 preferably formed of rubber hose or the like. The hoses have a transverse spacing permitting the ready support of a potato thereon with the latter in contact with both belts or those elements. The belts are supported on a pair of drive sheaves 36 and 38 spaced longitudinally of a supporting frame 40, with any suitable drive means being utilized to drive at least one of the sheaves. If the potatoes were fed directly from the chute 32 to the upper reaches of the belts 34, some of the potatoes would remain in contiguous relation on the belts, making high speed removal of selected potatoes most difficult. To overcome this problem, the spacing means 18 is utilized, and at the same time permits a dampening of the bouncing of the potatoes occasioned by the acceleration of the potatoes when transferred to the conveyor.

As here illustrated, such means 18 includes a wheel 42 mounted for rotation about an axis parallel to that of the conveyor drive sheave 36. The wheel is positioned adjacent the juncture of the discharge end of chute 32 and the conveyor belts 34, and is provided with a pneumatic tire or boot 44 maintained with only a few pounds of pressure. Preferably, the tire has a circumferentially extending peripheral recess 46 in the center thereof. By referring to FIG. 2, it will be seen that when the potatoes are placed on the conveyor belts, they will be engaged by the peripheral surface of the tire, the latter deflecting against the internal tire pressure. Wheel 42 is operatively connected to sheave 36 so that the tire is rotated at the same lineal speed as the conveyor. This speed is greater than the speed at which the potatoes are delivered from the chute so that the potatoes will not only be settled down on the belts, but will likewise be longitudinally spaced therealong.

As above mentioned, the ejection devices 20 are utilized to knock potatoes transversely off the conveyor belts at longitudinally spaced stations along its length, with potatoes of a certain size range being ejected at the various stations. The ejection devices comprise no independent part of the present invention, and a particular form of apparatus for performing this size selection and ejection operation is disclosed in U.S. Pat. 3,282,419. In general, and as disclosed in said patent, the devices are positioned at spaced locations along the length of the conveyor with the device at each station knocking off the potatoes falling within a certain size range. This is a desirable arrangement in that the purchaser of a particular bag or box of potatoes will thus acquire potatoes, all having the same general size.

As shown in FIG. 2, two sets of ejection devices are used, one set for each set of belts. Extending along a side of each conveyor opposite to the side on which the devices 20 are positioned is a curtain or sheet 50 of canvas or similar material which intercepts the ejected potato, dampens its movement and permits the same to gravitally fall towards and onto a transversely extending conveyor 52 forming part of the receiving means 22. One such conveyor is provided at each ejector device or station and is driven on a pair of sheaves 54 and 56 carried on the frame.

When the potatoes on conveyor 50 reach the forward sheave 54 they fall from the same through a chute 58. Subjacent each chute is a container supporting apparatus 60 which is selectively adapted to support either a box 62 or a sack 64, as will be later described in more detail. In any event, it will be understood that the potatoes delivered from the conveyor 52 will fall into the container placed therebetween.

As an important feature of this invention, means are provided for stopping delivery of potatoes through the respective chutes 58 when some predetermined weight of potatoes have fallen into the box 62 or sack 64. As here shown, each of the supporting apparatus 60 are mounted on the frame 40 and include spaced vertical walls 65, a base plate 66, vertical frame elements 68 and 72 disposed at the upper and lower ends of frame 68. The rear end portions of frames 70 and 72 are pivotally attached to main frame 40 for pivotal movement between the solid line and dash-dot line showing of FIG. 2. Also extending rearwardly from the lower end of frame 68 is a cantilever arm 74 carrying counterweights 76 thereon, the amount of the weights being variable by adding or taking away additional weights 78 and by sliding weight elements 80 along the length of the arm. Suitable stops 82 are provided on the frame 40 to limit the movement of arm 74, and consequently of the apparatus 60. The arrangement is such that the parts are normally in the position illustrated in solid lines in FIG. 2. As the potatoes are deposited in a container supported on such apparatus, such weight will overcome the action of the counterweights on arm 74 and the apparatus will pivot downwardly about first points 84 and 86 to the illustrated dash-dot position of the parts. Since the arm 74 will likewise be moved, a suitable switch mechanism, such as a magnet carried thereon will actuate a reed switch 88 carried on the main frame, resulting in actuation of the potato interrupting means 24 and halting further flow of potatoes into the container.

More particularly, it will be noted that chute 58 includes stationary side walls 90 having a downwardly inclined bottom wall 92, so that potatoes passing from conveyor 52 will drop through the chute. The interrupting mechanism 24 includes a pair of side walls 94 and a curved bottom wall or gate 96, the side walls being carried on a pivot shaft 98 journalled on the frame 98 whereby the bottom wall may be moved from an inoperative position subjacent and rearwardly of the discharge end of chute 58 to an intercepting position forwardly thereof. In the latter position, potatoes from conveyor 52 will accumulate in the space defined by the chute side walls 90 and the curved bottom 96 of the interrupting means.

Actuation of the means 24 is effected by an air cylinder 100 which is controlled by the switch 88. The cylinder is provided with a piston rod 102 whose distal end carries a link 104, the latter being connected to the shaft 98 for oscillating the latter between the previously described positions of movement. Obviously, any suitable switch means may be used to cause cylinder operation. After a filled container is removed, an empty container placed subjacent the chute, the operator may press a switch 106 causing a restriction of rod 102 and return of the means 24 to its inoperative position, the previously accumulated potatoes then being dumped into the new container.

The container supporting apparatus 60 is provided with spaced brackets 108 adapted to releasably support a short length of a roller conveyor 110, the latter being adapted to support a box 62. When the predetermined weight of potatoes has been dumped into the box, causing actuation of the switch 88 and halting of further delivery of potatoes, the operator may then push the filled box rearwardly onto a downwardly inclined roller conveyor 112, for deposit on a platform 114 or any suitable take-away conveyor.

Where the sacks 64, rather than boxes 62, are used, the conveyor 110 is removed, as shown in FIG. 3, and the sack is hung on the apparatus 60. The upper end of the latter is provided with a U-shaped pipe section 116 having rearwarly directed barbs or pins 118 at the sides thereof. The open ends of the section are adapted to telescopically receive a similar V-shafted pipe setcion 120 having forwardly directed barbs or pins 122. The sack is installed on the pins and held in an open position thereby.

Preferably a flexible curtain 125 is interposed across the chute so as to slow down or dampen the movement of the potatoes as they fall into the box or sack.

As shown in FIG. 1 of the drawing, five stations are provided, generally indicated at 124, 126, 128, 130 and 132. At station 124, a sack 64 is shown receiving the potatoes 26. At stations 126, a box 62 is shown in a filled condition, with the switch 88 actuated and the curved gate 96 of means 24 intercepting further flow of potatoes. The receiving stations illustrate boxes in their receiving position.

I claim:

1. Article handling and size sorting apparatus including conveyor means for supporting and moving articles of varying sizes in a single spaced column along a single lineal path, a plurality of ejection devices for knocking selected sized articles transversely off of said conveyor means at spaced stations therealong whereby each station will receive articles possessing substantially the same size, container supporting means for each station, means at each station guiding said articles when ejected from said conveyor means to said container supporting means, a gate at each station movable between a first operative position intercepting movement of articles through said guiding means and cooperating with said guiding means to accumulate articles therein as the articles are ejected and a second inoperative position spaced from said guiding means and permitting movement of articles therethrough, and means responsive to a predetermined weight of articles delivered to said container supporting means for moving said gate from its inoperative to its operative position.

2. Apparatus as set forth in claim 1 including manually operable means for returning said gate to its inoperative position.

3. Apparatus as set forth in claim 1 in which said conveyor means includes a pair of parallel belt elements having generally circular cross-sectional configurations and formed of resilient and flexible material.

4. Apparatus as set forth in claim 3 including means for delivering articles to said conveyor means, a cylindrical member overlying said conveyor means adjacent said delivery means, said member having a resilient yieldable peripheral surface for engaging the upper surface of an article deposited on said conveyor means, and means for rotating said member so that said surface travels at the same lineal speed as the lineal speed of said conveyor means.

5. Apparatus as set forth in claim 4 in which said peripheral surface is provided with a circumferential groove aligned with the spacing between said belt elements.

6. Apparatus as set forth in claim 1 including a conveyor disposed subjacent said conveyor means at each station and extending transversely thereof for receiving articles ejected from said conveyor means, and said guide means receiving articles from said conveyor.

7. Apparatus as set forth in claim 1 in which said guiding means includes a pair of spaced side walls and a downwardly inclined bottom wall, and said gate includes a curved wall section underlying said bottom wall in its inoperative position and extending between said side walls across said bottom wall in its operative position.

8. Apparatus as set forth in claim 1 in which said container supporting means is movable between a first position for receiving articles and a second position when a predetermined weight of articles is deposited thereon, and said gate moving means includes a switch actuated by movement of said container supporting means.

9. Apparatus as set forth in claim 8 in which said container supporting means is mounted for pivotal movement between said two positions, and an arm carrying a counterweight extends from said container supporting means.

10. Apparatus as set forth in claim 9 in which said container supporting means includes a plurality of pins for supporting an article-receiving sack in an open position for receiving articles from said guiding means.

11. Apparatus as set forth in claim 1 in which said container supporting means includes a container-supporting roller conveyor mounted thereon, and a second conveyor aligned with said roller conveyor for receiving filled containers from said roller conveyor.

References Cited

UNITED STATES PATENTS

| | | | |
|---|---|---|---|
| 2,027,840 | 1/1936 | Rodin | 248—100 X |
| 2,889,131 | 6/1959 | Crabb | 177—120 |
| 3,073,399 | 1/1963 | Durand | 177—53 |
| 3,416,619 | 12/1968 | McClusky | 177—53 |
| 3,422,954 | 1/1969 | Crawford | 209—102 |

RICHARD A. SCHACHER, Primary Examiner

U.S. Cl. X.R.

209—74, 82, 121